United States Patent
Kim et al.

(10) Patent No.: US 11,195,093 B2
(45) Date of Patent: Dec. 7, 2021

(54) APPARATUS AND METHOD FOR STUDENT-TEACHER TRANSFER LEARNING NETWORK USING KNOWLEDGE BRIDGE

(71) Applicant: Samsung Electronics Co., Ltd., Gyeonggi-do (KR)

(72) Inventors: Jaeyoung Kim, San Diego, CA (US); Mostafa El-Khamy, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 1004 days.

(21) Appl. No.: 15/867,303

(22) Filed: Jan. 10, 2018

(65) Prior Publication Data

US 2018/0336465 A1    Nov. 22, 2018

Related U.S. Application Data

(60) Provisional application No. 62/507,987, filed on May 18, 2017.

(51) Int. Cl.
*G06N 3/08* (2006.01)
*G06N 7/00* (2006.01)
*G06N 3/04* (2006.01)

(52) U.S. Cl.
CPC ............. *G06N 3/08* (2013.01); *G06N 3/0445* (2013.01); *G06N 3/0454* (2013.01); *G06N 7/005* (2013.01)

(58) Field of Classification Search
CPC ................................. G06N 3/08; G06N 7/005
See application file for complete search history.

(56) References Cited

U.S. PATENT DOCUMENTS

| 7,062,476 B2 | 6/2006 | Mims |
| 2007/0239632 A1 | 10/2007 | Burges et al. |
| 2007/0260563 A1 | 11/2007 | Fan et al. |

(Continued)

OTHER PUBLICATIONS

Zhu, Chenxi et al. "A Re-ranking model for dependency parser with Recursive Convolutional Neural Network" arXiv:1505.05667 [Published 2015] [Retrieved Apr. 2021] <URL:https://arxiv.org/abs/1505.05667> (Year: 2015).*

(Continued)

*Primary Examiner* — Michael J Huntley
*Assistant Examiner* — Fen Christopher Tamulonis
(74) *Attorney, Agent, or Firm* — The Farrell Law Firm, P.C.

(57) ABSTRACT

An apparatus, a method, a method of manufacturing and apparatus, and a method of constructing an integrated circuit are provided. The apparatus includes a teacher network; a student network; a plurality of knowledge bridges between the teacher network and the student network, where each of the plurality of knowledge bridges provides a hint about a function being learned, and where a hint includes a mean square error or a probability; and a loss function device connected to the plurality of knowledge bridges and the student network. The method includes training a teacher network; providing hints to a student network by a plurality of knowledge bridges between the teacher network and the student network; and determining a loss function from outputs of the plurality of knowledge bridges and the student network.

20 Claims, 8 Drawing Sheets

(56) References Cited

U.S. PATENT DOCUMENTS

| | | |
|---|---|---|
| 2010/0082510 A1 | 4/2010 | Gao et al. |
| 2016/0055427 A1 | 2/2016 | Adjaoute |
| 2016/0078339 A1 | 3/2016 | Li et al. |
| 2016/0078361 A1 | 3/2016 | Brueckner et al. |
| 2017/0083829 A1 | 3/2017 | Kang et al. |
| 2017/0132528 A1 | 5/2017 | Aslan et al. |

OTHER PUBLICATIONS

T. N. Sainath, O. Vinyals, A. Senior and H. Sak, "Convolutional, Long Short-Term Memory, fully connected Deep Neural Networks," 2015 IEEE International Conference on Acoustics, Speech and Signal Processing (ICASSP), South Brisbane, QLD, Australia, 2015, pp. 4580-4584, doi: 10.1109/ICASSP.2015.7178838. (Year: 2015).*

Gajhede, Nicolai et al. "[CNN] with [BN] for classifying Hi-hat, snare, and bass percussion sound samples" AM '16 [Published 2016] [Retrieved Apr. 2021] <URL: https://dl.acm.org/doi/abs/10.1145/29864 16.2986453> (Year: 2016).*

Zhao, Yuanyuan et al. "Multidimensional Residual Learning based on Recurrent Neural Networks for Acoustic Modeling" Interspeech '16 [Published 2016] [Retrieved Apr. 2021] <URL: https://www.isca-speech.org/archive/Interspeech_2016/pdfs/0677.PDF> (Year: 2016).*

Moniz, Joel et al. "Convolutional Residual Memory Networks" arXiv:1606.05262 [Published 2016] [Retrieved Apr. 2021] <URL: https://arxiv.org/abs/1606.052621> (Year: 2016).*

Deming, Laura et al. "Genetic Architect: Discovering Genomic Structure with Learned Neural Architectures." arXiv:1605.07156 [Published 2016] [Retrieved Apr. 2021] <URL: https://arxiv.org/abs/1605.07156> (Year: 2016).*

Wang, Yisen et al. "Residual Convolutional CTC networks for Automatic Speech Recognition" arXiv:1702.07793 [Published Feb. 2017] [Retrieved Apr. 2021] <URL: https://arxiv.org/abs/1702.07793> (Year: 2017).*

George E Dahl et al., "Context-dependent pre-trained deep neural networks for large-vocabulary speech recognition," IEEE Transactions on Audio, Speech, and Language Processing, vol. 20, No. 1, pp. 30-42, 2012.8.

Geoffrey Hinton et al., "Deep neural networks for acoustic modeling in speech recognition: The shared views of four research groups," IEEE Signal Processing Magazine, vol. 29, No. 6, pp. 82-97, 2012.

Yann LeCun et al., "Convolutional networks for images, speech, and time series," The handbook of brain theory and neural networks, vol. 3361, No. 10, pp. 15, 1995.

Yann LeCun et al., "Gradient-based learning applied to document recognition," Proceedings of the IEEE, vol. 86, No. 11, pp. 2278-2324, 1998.

George E Dahl et al., "Large vocabulary continuous speech recognition with context-dependent dbn-hmms," 2011 IEEE international conference on acoustics, speech and signal processing (ICASSP). IEEE, 2011, pp. 4688-4691.

George Saon et al., "English conversational telephone speech recognition by humans and machines," arXiv preprint arXiv:1703.02136, 2017, pp. 7.

Yanmin Qian et al., "An investigation into using parallel data for far field speech recognition," in Acoustics, Speech and Signal Processing (ICASSP), 2016 IEEE International Conference on. IEEE, 2016, pp. 5725-5729.

Mirco Ravanelli et al., "Batch-normalized joint training for dnn-based distant speech recognition" in Spoken Language Technology Workshop (SLT), 2016 IEEE. IEEE, 2016, p. 28.

Jean Carletta et al., "The ami meeting corpus: A pre-announcement," in International Workshop on Machine Learning for Multimodal Interaction. Springer, 2005, pp. 28-39.

Jon Barker et al., "The third chime speech separation and recognition challenge: Dataset, task and baselines," 2015 IEEE Workshop on Automatic Speech Recognition and Understanding (ASRU), IEEE, 2015, pp. 504-511.

David Lopez-Paz et al., "Unifying distillation and privileged information," arXiv preprint arXiv:1511.03643, 2015, pp. 10.

Konstantin Markov et al., "Robust speech recognition using generalized distillation framework," Interspeech 2016, pp. 2364-2368, 2016.

Shinji Watanabe et al., "Student-teacher network learning with enhanced features," ICASSP '17, pp. 5275-5279, 2017.

Geoffrey Hinton et al., "Distilling the knowledge in a neural network," arXiv preprint arXiv:1503.02531, 2015, pp. 9.

Yoshua Bengio et al., "Curriculum learning," in Proceedings of the 26th annual international conference on machine learning. ACM, 2009, pp. 41-48.

Adriana Romero et al., "Fitnets: Hints for thin deep nets," arXiv preprint arXiv:1412.6550, 2014, pp. 13.

Yaser S Abu-Mostafa, "A method for learning from hints," in Advances in Neural Information Processing Systems, 1993, pp. 73-80.

Jaeyoung Kim et al., "Residual lstm: Design of a deep recurrent architecture for distant speech recognition," arXiv preprint arXiv:1701.03360, 2017, pp. 5.

Yi Sun et al., "Deeply learned face representations are sparse, selective, and robust," Proceedings of the IEEE Conference on Computer Vision and Pattern Recognition, 2015, pp. 2892-2900.

Yi Sun et al., "Deepid3: Face recognition with very deep neural networks," arXiv preprint arXiv:1502.00873, 2015, pp. 5.

Daniel Povey et al., "The kaldi speech recognition toolkit," in IEEE 2011 Workshop on Automatic Speech Recognition and Understanding. Dec. 2011, IEEE Signal Processing Society, IEEE Catalog No. CFP11SRW-USB, pp. 4.

Dong Yu et al., An introduction to computational networks and the computational network toolkit, Technical report, MSR-TR-2014-112, 2015, pp. 180.

Xavier Anguera et al., "Acoustic beamforming for speaker diarization of meetings," IEEE Transactions on Audio, Speech, and Language Processing, vol. 15, No. 7, pp. 2011-2022, 2007.

Y. Tai et al., "Image Super-Resolution via Deep Recursive Residual Network," 2017 IEEE Conference on Computer Vision and Pattern Recognition (CVPR), Honolulu, HI, 2017, pp. 2790-2798, doi: 10.1109/CVPR.2017.298.

* cited by examiner

US 11,195,093 B2

APPARATUS AND METHOD FOR STUDENT-TEACHER TRANSFER LEARNING NETWORK USING KNOWLEDGE BRIDGE

PRIORITY

This application claims priority under 35 U.S.C. § 119(e) to a U.S. Provisional Patent Application filed on May 18, 2017 in the United States Patent and Trademark Office and assigned Ser. No. 62/507,987, the entire contents of which are incorporated herein by reference.

FIELD

The present disclosure relates generally to deep learning neural networks, and more particularly, to an apparatus and method for a student-teacher transfer learning network using a knowledge bridge.

BACKGROUND

Despite the remarkable progress recently achieved on automatic speech recognition (ASR), recognizing far-field speech (e.g., speech originating far from a microphone that picks up the speech) mixed with various noise sources is still a challenging task.

The design of ASR has been fundamentally changed by the emergence of deep neural networks (DNN). Acoustic models based on DNN easily outperformed the prior state-of-the-art Gaussian mixture models (GMMs) in classifying input speech frames. With the evolution of the advanced neural network architectures such as convolutional neural networks (CNN) and recurrent neural networks (RNN), the current best performing ASR reaches recognition accuracy almost close to human hearing capability. However, most ASR systems are based (e.g., trained) on close-talk clean speech (e.g., speech originating close to a microphone that picks up the speech without any noise). Recognizing far-field speech mixed with noise, reverberation, and interference can significantly degrade ASR.

There has been a great effort to improve distant (e.g. far-field) speech recognition. Multi-task denoising jointly optimizes denoising and recognition blocks within a unified neural network to show some improvement on recognizing noisy speech from the Augmented Multi-party Interaction (AMI) and Computational Hearing in Multisource Environments (CHiME) corpora. However, its performance is not consistent but dependent on the architecture of the underlying acoustic models. For example, convolutional long short term memory (LSTM) did not have any improvement from multi-task denoising, unlike the DNN models.

SUMMARY

According to one embodiment, an apparatus includes a teacher network; a student network; a plurality of knowledge bridges between the teacher network and the student network, where each of the plurality of knowledge bridges provides a hint about a function being learned, and where a hint includes a mean square error or a probability; and a loss function device connected to the plurality of knowledge bridges and the student network.

According to one embodiment, a method includes training a teacher network; providing hints to a student network by a plurality of knowledge bridges between the teacher network and the student network; and determining a loss function from outputs of the plurality of knowledge bridges and the student network.

According to one embodiment, a method of manufacturing an apparatus includes forming the apparatus on a wafer or a package with at least one other apparatus, wherein the apparatus includes a teacher network; a student network; a plurality of knowledge bridges between the teacher network and the student network; and a loss function device connected to the plurality of knowledge bridges and the student network, and testing the apparatus using one or more electrical to optical converters, one or more optical splitters that split an optical signal into two or more optical signals, and one or more optical to electrical converters.

According to one embodiment, a method of constructing an integrated circuit includes generating a mask layout for a set of features for a layer of the integrated circuit, wherein the mask layout includes standard cell library macros for one or more circuit features that include an apparatus that includes a teacher network; a student network; a plurality of knowledge bridges between the teacher network and the student network; and a loss function device connected to the plurality of knowledge bridges and the student network; disregarding relative positions of the macros for compliance to layout design rules during the generation of the mask layout; checking the relative positions of the macros for compliance to layout design rules after generating the mask layout; upon detection of noncompliance with the layout design rules by any of the macros, modifying the mask layout by modifying each of the noncompliant macros to comply with the layout design rules; generating a mask according to the modified mask layout with the set of features for the layer of the integrated circuit; and manufacturing the integrated circuit layer according to the mask.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
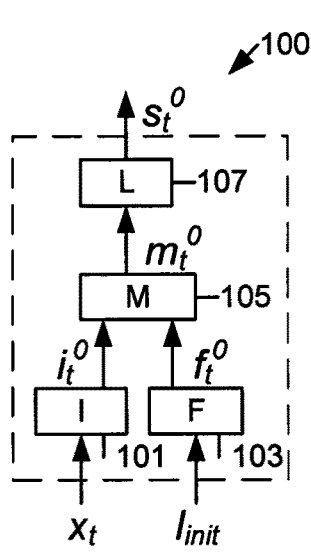
FIG. 1 illustrates an exemplary block diagram of a recursive network with zero recursions.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Multi-task denoising was proposed to jointly optimize denoising and recognition networks integrated within a unified neural network. The denoising network receives noisy acoustic input $x_t$ at time t and is trained to generate a denoised output by minimizing a mean square error (MSE) with synchronized clean acoustic input $x_t^*$ as in Equation (1):

$$L_{MSE}(\varphi_{de}) = \Sigma_{t=1}^{T} | q^{de}(x_t; \varphi_{de}) - x_t^* |^2 \quad (1)$$

where, T is mini-batch size, $q^{de}(\cdot)$ is the denoised output and $\varphi_{de}$ is a collection of learnable parameters in the denoising network. The enhanced feature $q^{de}$ is provided to the recognition network to predict phoneme sequences. Since the denoising network is cascaded with the recognition network, gradients from the recognition loss function are back-propagated into the denoising network. The multi-task loss function, $L_{DE}$ is described in Equations (2) and (3) as follows:

$$L_{CE}(\varphi_{de}, \varphi_{re}) = \Sigma_{t=1}^{T} CE(y_t^{label}, P(x_t; \varphi_{de}, \varphi_{re})) = -\Sigma_{t=1}^{T} \Sigma_{i=1}^{D} P(y_t^{label}(i)) \log P(x_t(i); \varphi_{de}, \varphi_{re}) \quad (2)$$

$$L_{DE}(\varphi_{de}, \varphi_{de}) = (1-\alpha) L_{CE}(\varphi_{de}, \varphi_{re}) + \alpha L_{MSE}(\varphi_{de}) \quad (3)$$

where $\varphi_{re}$ is a collection of learnable parameters in the recognition network, $CE(\cdot, \cdot)$ is a cross-entropy, $P(\cdot)$ is the softmax output of the recognition network, $y_t^{label}$ is a ground truth label at t, $\alpha$ is a weighting factor to balance between two loss functions and D is the dimension of output label.

Some approaches use a student-teacher. Knowledge distillation (KD) transfers generalization ability of a bigger teacher network to a typically much smaller student network. It provides soft-target information computed by the teacher network, in addition to its hard-targets, so the student network can learn to generalize similarly. Generalized distillation (GD) extends distillation methods by training a teacher network with separate clean data. A student network is trained on noisy data and, at the same time, guided by the soft-labels from a teacher which has access to synchronized clean speech. Although GD method showed decent performance on various corpora, it only utilized a soft output from a teacher network, which might miss the further possibility of speech enhancements.

KD allows the transfer of a generalization ability of a large teacher network to a smaller student network. That is, soft-target and hard-target information computed by the teacher network are provided to the student network so that the student network can learn to similarly generalize as the teacher network.

If $x_t$ is an input feature for both teacher and student networks at time t, then $P_T(x_t)$ is a softmax output of a teacher network and $P_S(x_t)$ is a softmax output of a student network. The student network is, in turn, trained to minimize a weighted average of two objective functions as in Equation (4):

$$L_{KD}(\varphi) = (1-\alpha) \Sigma_{t=1}^{T} CE(P_T(x_t), P_S(x_t; \varphi)) + (\alpha) \Sigma_{t=1}^{T} CE(y_t^{label}, P_S(x_t; \varphi)) \quad (4)$$

where $\varphi$ is a collection of parameters in a student network and $L_{KD}(\varphi)$ is a loss function for KD. The extended knowledge distillation provides separate privileged data to a teacher network for better posterior estimation. In some methods, a teacher network is trained with parallel clean data $x_t^*$ instead of noisy data. Through knowledge distillation, the teacher network can implicitly transfer the ability to denoise noisy data to a student network.

Curriculum learning was proposed to find a better local minimum by incrementally training a network with a predefined sequence of training data. That is, a network is trained on an easy task and then trained for a harder task by augmenting a dataset with harder examples. Carefully choosing a sequence of training data can accelerate training convergence with better generalization performance. For example, a sequence of training data may be generated with increasing noise variance. A network may then be initially trained with less noisy data and progressively trained with more noisy data.

The present disclosure concerns a student-teacher learning transfer apparatus and a method. For example, a teacher network may be a well-trained network that is larger than a student network. The student network may be trained using the student-teacher framework to perform as well as the teacher network. The present disclosure includes a knowledge bridge or a hint. A knowledge bridge is an interconnection between a student network and a teacher network to provide a hint about the function being learned. Hints are not only provided by the teacher network at a final layer for a final output but also at intermediate layers with the same level of abstraction to guide the student network to a better solution. A hint may include a mean square error (MSE) or a probability (e.g., a softmax probability). The purpose is to train the student network by considering the hint. Without the hint, the student network is trained to minimize an original loss function. But with the hint, it considers a "denoising" aspect by trying to resemble a teacher layer output. The hint becomes part of the original loss function. Moreover, the teacher network need not be trained on the same problem as the student network, but its previous knowledge in a related problem may be leveraged to guide the student network with multiple hints delivered via knowledge bridges.

In one embodiment, the present disclosure includes a RNN architecture. The recursive architecture cascades base networks multiple times to form a deep RNN. The proposed recursive architecture can iteratively refine recognition and denoising performance. As ASR performance can be enhanced by signal denoising, signal denoising can be also improved by reference to ASR output. The proposed recursive architecture enables bi-directional information flows between signal denoising and speech recognition functions by simple network cascading.

FIG. 1 illustrates an exemplary block diagram of a recursive network with zero recursions.

Referring to FIG. 1, a building block 100 of a recursive architecture is shown. The building block 100 may be composed of four sub-blocks: I 101, F, 103, M 105, and L 105. Sub-blocks I 101 and F 103 receive acoustic features and feedback states as their inputs, sub-block M 105 merges outputs of sub-block I 101 and sub-block F 103, and sub-block L 107 produces recognized phone states. The building block 100 may be any type of network. $i_t^0$, $f_t^0$, $m_t^0$ and $s_t^0$ represents outputs of sub-block I 101, sub-block F 103, sub-block M 105, and sub-block L 107, respectively. The "0" indicates that there are 0 recursions. $l_{init}$ is a zero vector used as input for the zero recursions.

Figure 2:
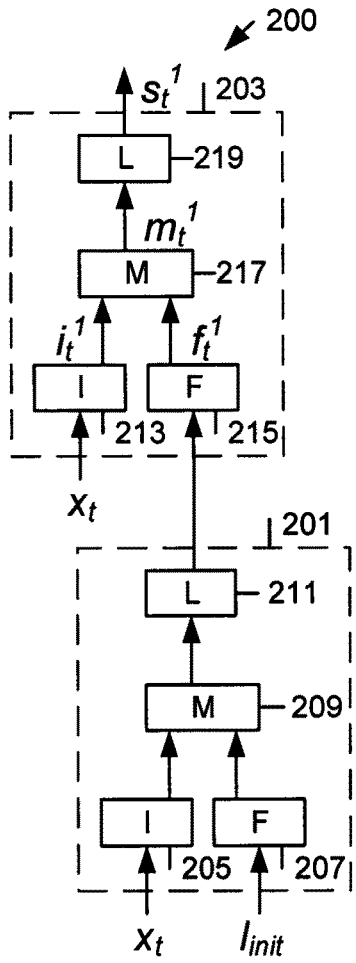
FIG. 2 illustrates an exemplary block diagram of a recursive network with one recursion.

FIG. 2 illustrates an exemplary block diagram of a recursive network with one recursion.

Referring to FIG. 2, two building blocks 201 and 203 are connected to form a recursive architecture 200 with one recursion, where each of the two building blocks 201 and 203 are identical to the building block 100 of FIG. 1. The first building block 201 includes sub-blocks I 205, sub-block F 207, sub-block M 209, and sub-block L 211. Sub-blocks I 205 and F 207 receive $x_t$ and $l_{init}$, respectively. The second building block 203 includes sub-blocks I 213, sub-block F 215, sub-block M 217, and sub-block L 219. Sub-blocks I 213 and F 215 receive $x_t$ and the output of sub-block L 211, respectively. $i_t^1$, $f_t^1$, $m_t^1$ and $s_t^1$ represent outputs of sub-block I 213, sub-block F 215, sub-block M 217, and sub-block L 219, respectively. The "1" indicates that there is one recursion.

Figure 3:
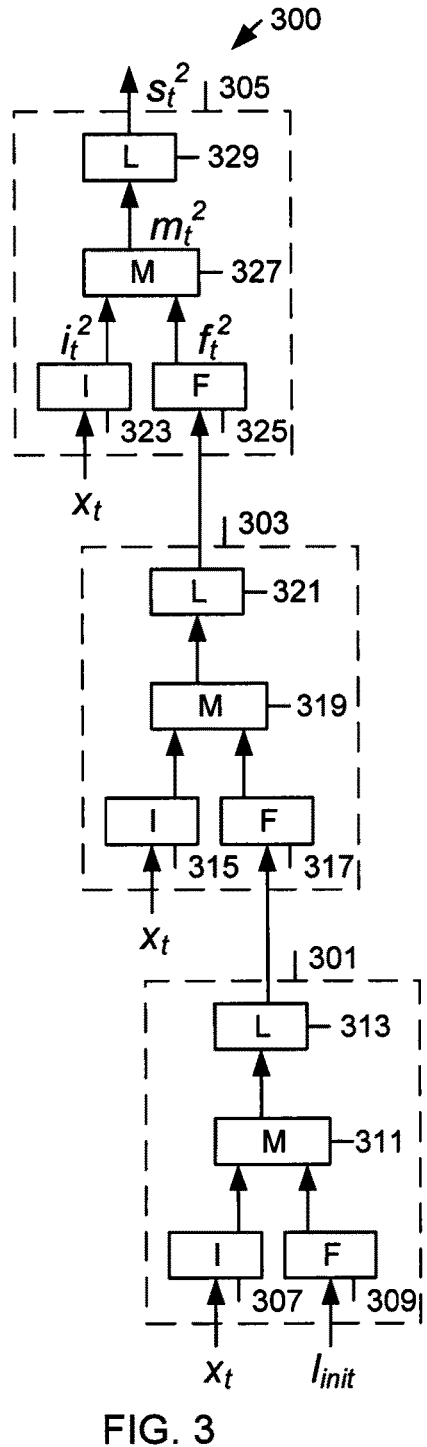
FIG. 3 illustrates an exemplary block diagram of a recursive network with two recursions.

FIG. 3 illustrates an exemplary block diagram of a recursive network with two recursion.

Referring to FIG. 3, three building blocks 301, 303, and 305 are connected to form a recursive architecture 300 with two recursions, where each of the three building blocks 301, 303, and 305 are identical to the building block 100 of FIG. 1. The first building block 301 includes sub-blocks I 307, sub-block F 309, sub-block M 311, and sub-block L 313. Sub-blocks I 307 and F 309 receive $x_t$ and $l_{init}$, respectively. The second building block 303 includes sub-blocks I 315, sub-block F 317, sub-block M 319, and sub-block L 321. Sub-blocks I 315 and F 317 receive $x_t$ and the output of sub-block L 313, respectively. The third building block 305 includes sub-blocks I 323, sub-block F 325, sub-block M 327, and sub-block L 329. Sub-blocks I 323 and F 325 receive $x_t$ and the output of sub-block L 321, respectively. $i_t^2$, $f_t^2$, $m_t^2$ and $s_t^2$ represent outputs of sub-block I 213, sub-block F 215, sub-block M 217, and sub-block L 219, respectively. The "2" indicates that there are recursions.

FIGS. 1-3 illustrate a recursive network in the depth direction. The input $x_t$ is applied to the network for each recursion. The repeated input acts as a global shortcut path that is used to train a deep architecture. The recursive network may be expressed as in Equation (5) as follows:

$$m_t^n = g(W_1 i_t^n(x_t) + W_2 f_t^n(s_t^{n-1}) + b) \quad (5)$$

where $m_t^n$ is an output of a sub-block M of the recursive network at time t in a recursive level n, n is an integer, g is a non-linear function, $W_1$, $W_2$, and b are internal learnable parameters of sub-block M, $i_t^n$ is an output of a sub-block I of the recursive network at time t in a recursive level n, $x_t$ is an acoustic input at time t, $f_t^n$ is an output of a sub-block F of the recursive network at time t in a recursive level n, and $s_t^{n-1}$ is an output of a sub-block L of the recursive network at time t in a recursive level n−1. Two paths are affine-transformed and added together before going into non-linear function g.

For automatic speech recognition, the data input for a teacher network may be clean acoustic features such as a microphone recording from a headset in close proximity to the microphone. The data input for a student network may be a recording from a microphone that is relatively far from a user, so the recording may be mixed with noise, channel, and/or other speaker interference.

Figure 4:
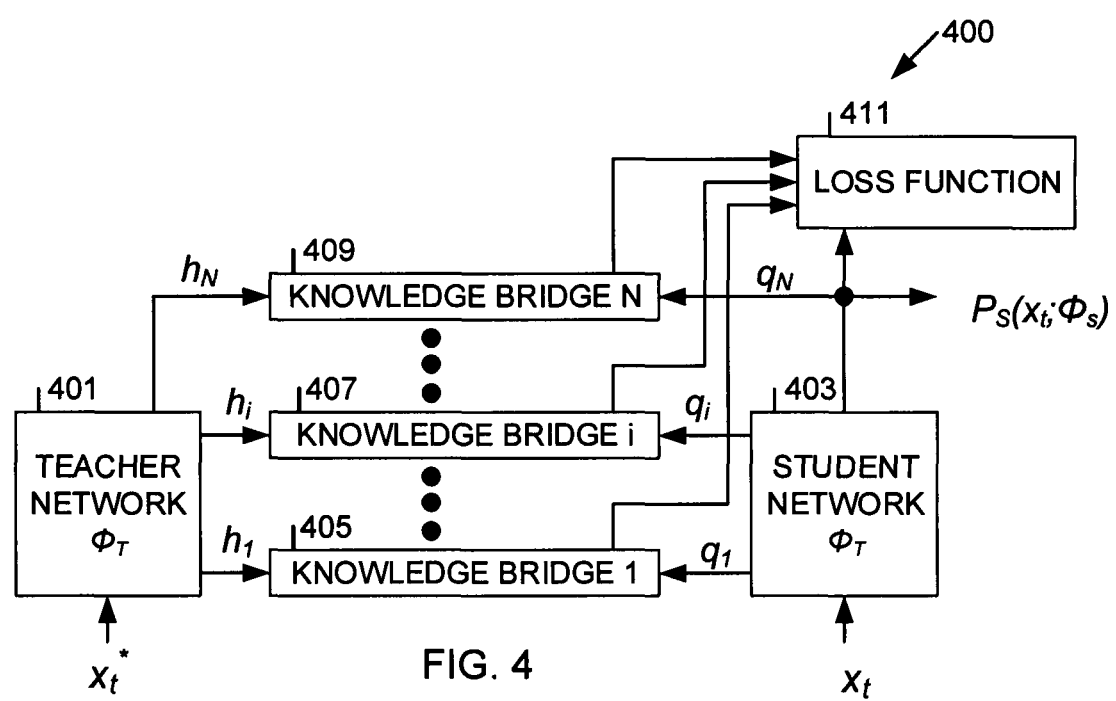
FIG. 4 illustrates an exemplary block diagram of the present student-teacher network, according to one embodiment.

FIG. 4 illustrates an exemplary high-level block diagram of the student-teacher network when recursive architecture is not applied.

Referring to FIG. 4, a student-teacher network 400 includes a teacher network 401, a student network 403, a plurality of knowledge bridges 405, 407, and 409, and a loss function device 411.

The teacher network 401 includes an input for receiving data $x_t^*$ that includes privileged clean data and a plurality of outputs $h_1$, $h_i$, and $h_N$ connected to the knowledge bridges 405, 407, and 409, respectively, where the output $h_N$ is the same as the output $P_T(x_t^*, \varphi_T)$ of the teacher network 401.

The student network 403 includes an input for receiving data $x_t$ that is a noisy version of $x_t^*$, and a plurality of outputs $q_1$, $q_i$, and $q_N$ connected to the knowledge bridges 405, 407, and 409, respectively, where the output $q_N$ is also the output $P_S(x_t, \varphi_S)$ of the student network 403.

The teacher network 401 has the same number of feature representation levels or layers as the student network 403. In one embodiment, both the teacher network 401 and the student network 403 are identical, except for the values of their trained parameters. However, the present disclosure is not limited thereto. The teacher network may have a different number of layers as compared with the student network. The knowledge bridges, therefore, can have inputs from the student and the teacher networks that does not have the same level of feature representation or layers.

The teacher network 401 provides a number of hints $h_1, \ldots, h_N$ which provide examples, at different levels of representation of the input feature, to the student network 403 through the knowledge bridges 405, 407, and 409, respectively. An error measure $e_i$ of how the feature $q_s$ agrees with the hint $h_i$ can be computed at the knowledge bridges 405, 407, and 409 as the MSE loss, $e_i(\phi_s)=\Sigma_{t=1}^{L}|h_i(x_t^*)-q_i(x_t;\phi_S)|^2$ In case the hint $h_N$ is the softmax output probability, then a cross entropy (CE) loss between the posterior softmax output probabilities, $e_N(\phi_s)=CE(P_T(x_t^*;\phi_T),P_S(x_t;\phi_S))=-\Sigma_{t=1}^{Tmb}\Sigma_{i=1}^{Do} P_T(x_t^*;\phi_T)(i) \log P_S(x_t;\phi_S)(i)$ of the student network 403 and the teacher network 401 is used instead. $P_S(x_t;\phi_S)(i)$ and $P_T(x_t^*;\phi_T)(i)$ are the probabilities of the $i^{th}$ class, respectively. $D_O$ is a dimension of the corresponding network output and $T_{mb}$ is the number of mini-batch frames. The parameters of the student network 403 are then optimized by minimizing a weighted sum of all corresponding loss functions $L(\phi_S)=\Sigma_{i=1}^{N} \alpha_i e_i(\phi_S)$.

Figure 5:
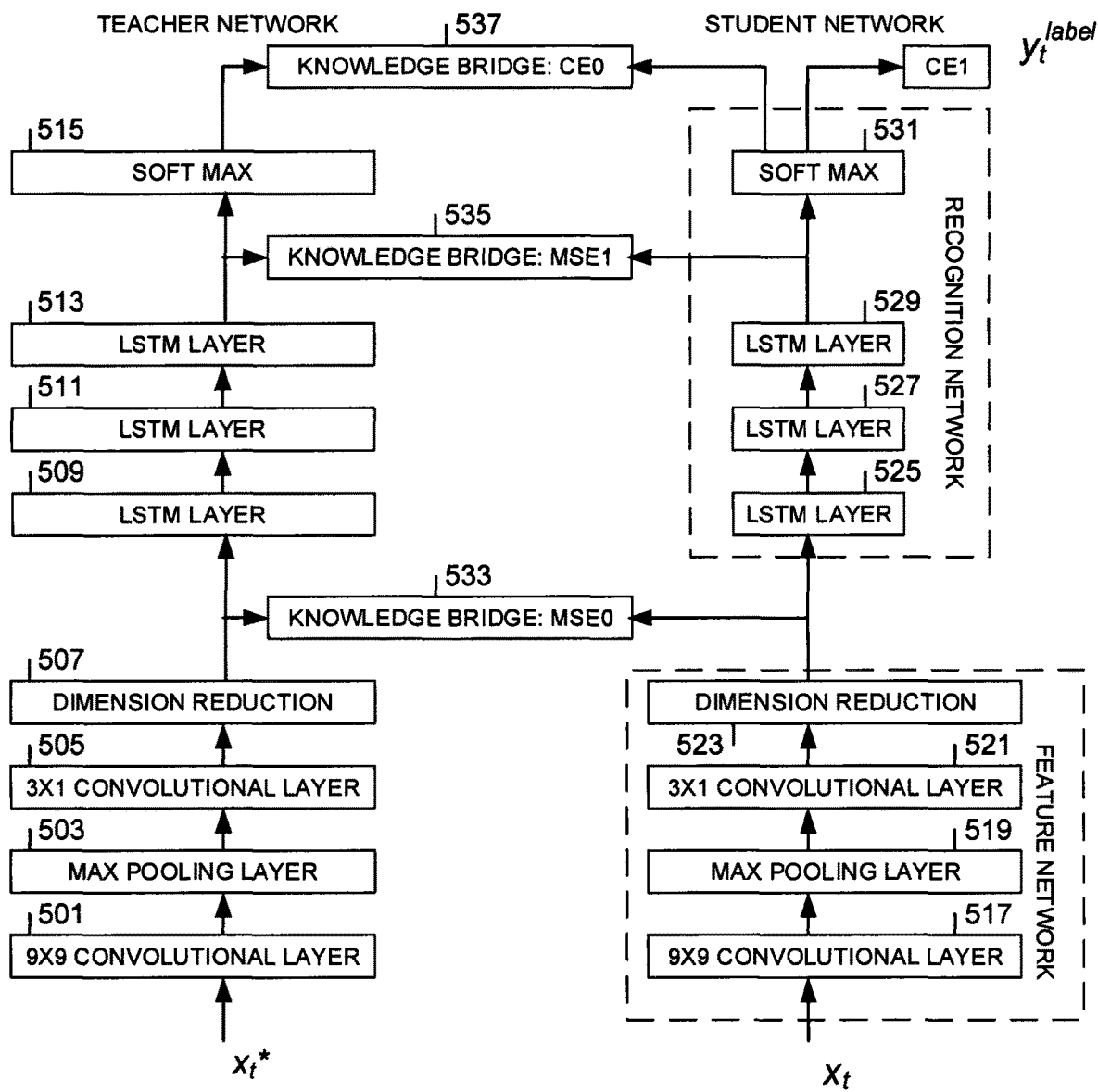
FIG. 5 illustrates an exemplary implementation diagram of a student and teacher network with three network bridges, according to one embodiment.

FIG. 5 illustrates an exemplary implementation diagram of a student and teacher network with three knowledge bridges, according to one embodiment.

Referring to FIG. 5, a teacher network includes a 9×9 convolutional layer 501, a max pooling layer 503, a 3×1 convolutional layer 505, a dimension reduction layer 507, a first LSTM layer 509, a second LSTM layer 511, a third LSTM layer 513, and a softmax layer 515. The convolutional layers refine the low-level acoustic features to reduce environmental and speaker variability. The dimension reduction layer is a fully-connected layer which reduces high dimensions of CNN output into smaller manageable dimensions for the next LSTM layer.

Referring to FIG. 5, a student network includes a 9×9 convolutional layer 517, a max pooling layer 519, a 3×1 convolutional layer 521, a dimension reduction layer, a first LSTM layer 525, a second LSTM layer 527, a third LSTM layer 529, and a softmax 531. The convolutional layers refine the low-level acoustic features to reduce environmental and speaker variability. The dimension reduction layer is a fully-connected layer which reduces high dimensions of CNN output into smaller manageable dimensions for the next LSTM layer. The last three LSTM layers are for speech recognition.

FIG. 5 illustrates a specific implementation of the proposed student and teacher network for distant speech recognition, where the student and the teacher networks are the hybrid of convolution and LSTM layers. The each deep network consists of a recognition network and a feature network. The convolutional layers of the feature network refine the low-level acoustic features to reduce environmental and speaker variability. The output of the feature network is used as a hint to the first knowledge bridge 533, $$L_{DR}(\phi_f)=\Sigma_{t=1}^{Tmb}|q_S^f(x_t;\phi_f)-q_T^f(x_t^*)|^2 \quad (6)$$

where $\phi_f$ is a collection of parameters at the feature network of the student network, $q_T^f$ is the output of the feature network of the teacher network, $q_S^f$ is the output of the feature network of the student network, $x_t$ is a noisy input, $x_t^*$ is a clean input, and $T_{mb}$ is the number of mini-batch frames. The output of the feature network of the teacher network is used as a hint to guide the output from the corresponding feature network of the student network. $L_{DR}(\phi_f)$ is a mean square loss of the first knowledge bridge at the dimension reduction layer.

The recognition network includes three LSTM layers and a softmax layer both for student and teacher networks in FIG. 5. There are two knowledge bridges between the recognition networks of the teacher network and the student network in FIG. 5. The second knowledge bridge 535 provides an MSE regression between the outputs of the third LSTM layers 513 and 529 as in Equation (7):

$$L_{LSTM3}(\phi_f,\phi_r)=\Sigma_{t=1}^{Tmb}|q_S^r(x_t;\phi_f,\phi_r)-q_T^r(x_t^*)|^2 \quad (7)$$

where $\phi_f$ is a collection of parameters at the feature network of the student network, $\phi_r$ is the set of learnable parameters at the recognition network of the student network, $q_S^r$ and $q_T^r$ are the outputs of the third LSTM layer devices 513 and 529 of the recognition networks, respectively, $x_t$ is a noisy input, $x_t^*$ is a clean or enhanced input, and $T_{mb}$ is the number of mini-batch frames. The third knowledge bridge 537 uses the softmax output for knowledge distillation as in Equation (8):

$$L_{KD}(\phi_f,\phi_r)=(1-\alpha)\Sigma_{t=1}^{Tmb}CE(P_T(x_t^*),P_S(x_t;\phi_f,\phi_r))+\alpha\Sigma_{t=1}^{Tmb}CE(y_t^{label},P_S(x_t;\phi_f,\phi_r)) \quad (8)$$

where $P_T$ and $P_S$ are softmax output probabilities of the teacher network and the student network, respectively. The student network is optimized with back propagation of the gradients in order to minimize the combined loss function as in Equation (9):

$$L(\phi_f,\phi_r)=L_{KD}(\phi_f,\phi_r)+\beta L_{DR}(\phi_f,\phi_r)+\gamma L_{LSTM3}(\phi_f) \quad (9)$$

where $\phi_f$ is a collection of parameters at the feature network of the student network, $\phi_r$ is the set of learnable parameters at the recognition network of the student network, $\beta$ and $\gamma$ are scaling factors for the second and third knowledge bridges.

The teacher network is pre-trained on $x_t^*$ and during training the student network, the teacher network only provides hints through the knowledge bridges 533, 535 and 537 to the student network. That is, the optimization is to minimize only the parameters in the student networks. The teacher network is pre-trained before and only provides bridge connections to the student networks.

Figure 6:
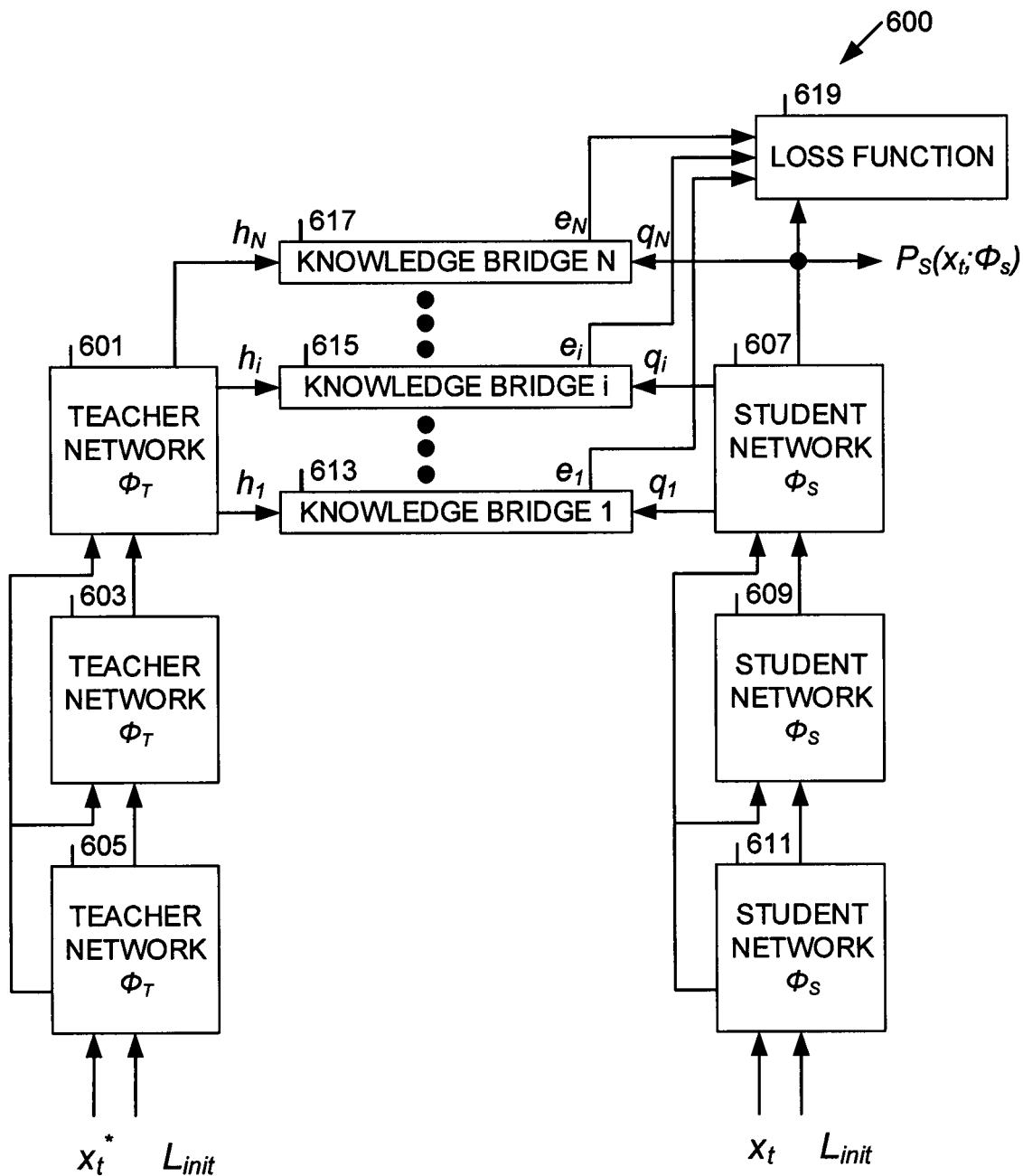
FIG. 6 illustrates an exemplary block diagram of a recursive student-teacher network, according to one embodiment.

FIG. 6 illustrates an exemplary block diagram of a recursive student-teacher network, according to one embodiment.

Referring to FIG. 6, a recursive student-teacher network 600 includes a plurality of teacher networks 601, 603, and 605, a plurality of student networks 607, 609, and 611, a plurality of knowledge bridges 613, 615, and 617, and a loss function device 619. Three levels of recursion in both the teacher networks 601, 603, and 605 and in the student networks 607, 609, and 611 are shown. However, the present disclosure is not limited to three levels of recursion or that the levels of recursion in the teacher networks and the student networks are the same.

The recursive teacher network and the recursive student network may have different levels of recursion. The recursive structure for each network repeats the same functions multiple times (e.g., M for a teacher network and N for a student network). Therefore, it is redundant to connect the same knowledge bridge at every recursion level. Instead, a knowledge bridge is connected at the last stage of the recursive teacher network and the recursive student network. The last recursion level provides the most refined feature representations, which would better guide the recursive student network than any knowledge bridge at a prior recursion level. The loss function 619 may be as in Equation (10):

$$L(\phi_s) = \Sigma_{i=1}^{N} \alpha_i e_i(\phi_s) \quad (10)$$

where $\phi_S$ is a collection of learnable parameters at the student network, N is an integer indicating a number of knowledge bridges, $\alpha_i$ is a predetermined weighting factor, and $e_i$ is an error measure. An error measure $e_i$ of how a feature representation $q_i$ from a student network agrees with the hint $h_i$ is computed at the knowledge bridges as a MSE loss as in Equation (11), $$e_i(\phi_S) = \Sigma_{i=1}^{T_{mb}} |h_i(x_t^*) - q_i(x_t; \phi_S)|^2 \quad (11)$$

where $\phi_s$ is the learnable parameters of a student network. Since $h_N$ and $q_N$ are softmax probabilities of teacher and student networks, the cross-entropy loss is used for $e_N$ instead as in Equation (12).

$$e_N(\phi_s) = CE(P_T(x_t^*; \phi_T), P_S(x_t; \phi_S)) = -\Sigma_{t=1}^{T_{mb}} \Sigma_{i=1}^{D_O} P_T(x_t^*; \phi_T)(i) \log P_S(x_t; \phi_S)(i) \quad (12)$$

$P_S(x_t; \phi_S)(i)$ and $P_T(x_t^*; \phi_T)(i)$ are the probabilities of the $i^{th}$ class, respectively. $D_O$ is a dimension of the corresponding network output and $T_{mb}$ is the number of mini-batch frames.

Figure 7:
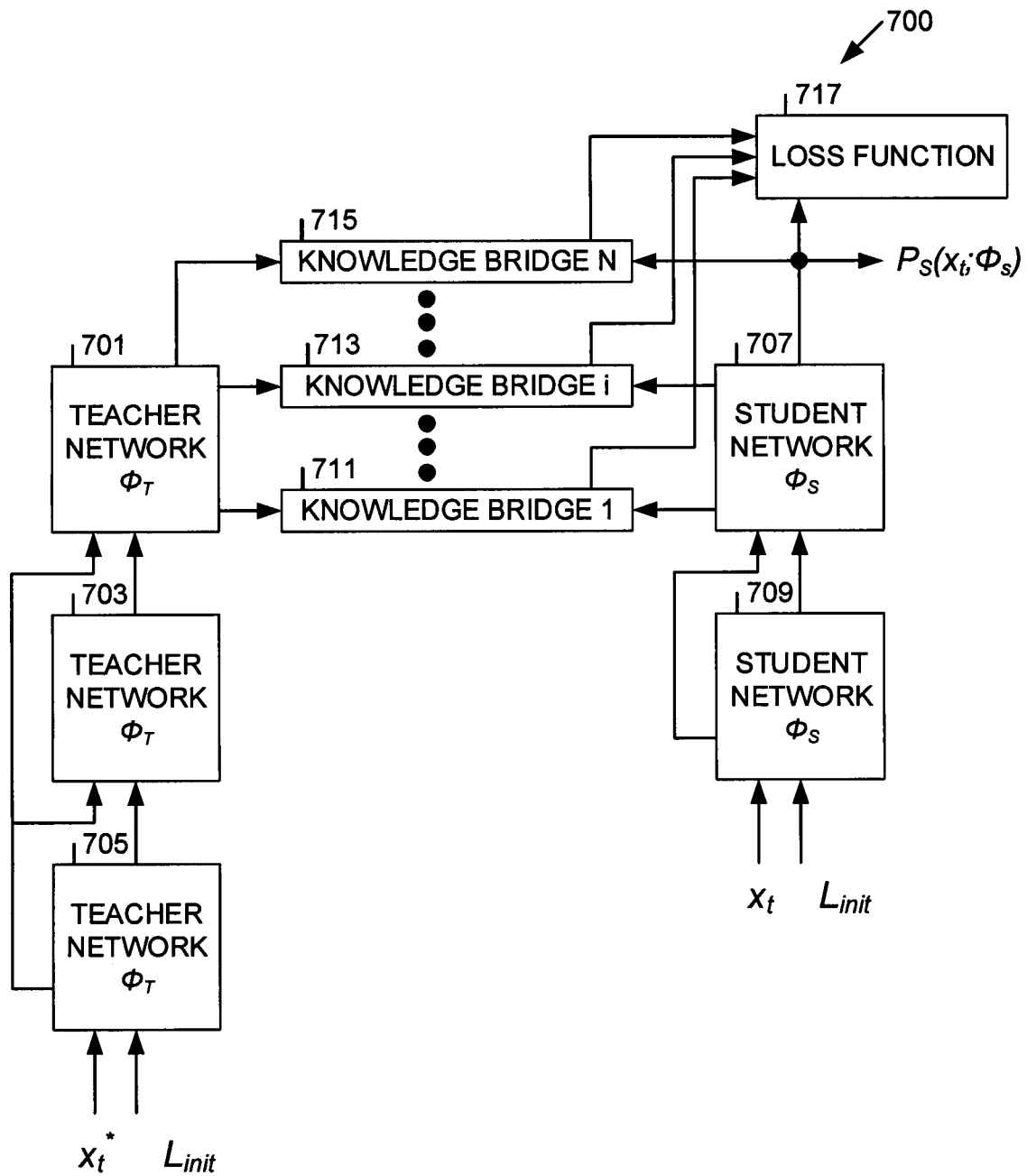
FIG. 7 illustrates an exemplary block diagram of a recursive student-teacher network with different levels of recursion for the student network and the teacher network, according to one embodiment.

FIG. 7 illustrates an exemplary block diagram of a recursive student-teacher network with different levels of recursion for the student network and the teacher network, according to one embodiment.

Referring to FIG. 7, a recursive student-teacher network 700 includes a plurality of teacher networks 701, 703, and 705, a plurality of student networks 707 and 709, a plurality of knowledge bridges 711, 713, and 715, and a loss function device 717. The teacher networks 701, 703, and 705 have three levels of recursion and the student networks 707 and 709 have two levels of recursion. Any combination of recursion levels may be used between the teacher networks and the student networks.

Figure 8:
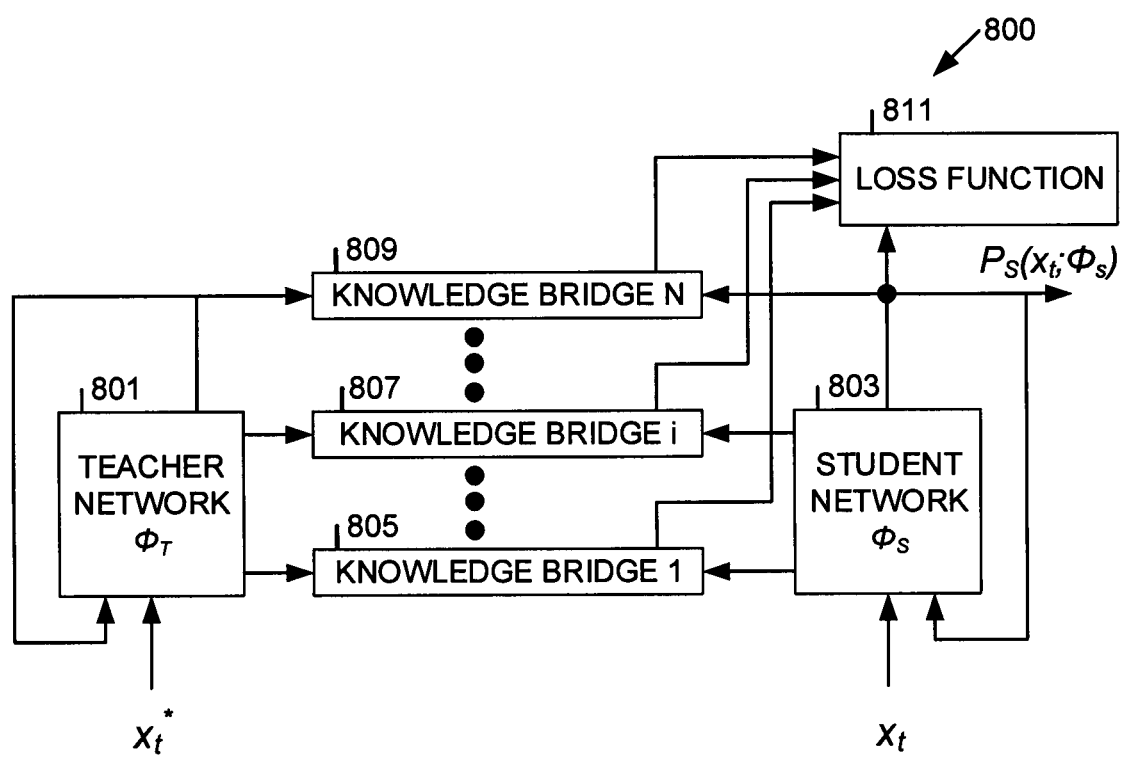
FIG. 8 illustrates an exemplary block diagram of another recursive student-teacher network, according to one embodiment.

FIG. 8 illustrates an exemplary block diagram of another recursive student-teacher network, according to one embodiment.

Referring to FIG. 8, a recursive student-teacher network 800 includes a recursive teacher network 801, a recursive student network 803, a plurality of knowledge bridges 805, 807, and 809, and a loss function device 811. The recursive teacher network 801 realizes any number of levels of recursion by feeding back an output of the recursive teacher network 801 for further processing by the recursive teacher network 801. The recursive student network 803 realizes any number of levels of recursion by feeding back an output of the recursive student network 803 for further processing by the recursive student network 803.

Figure 9:
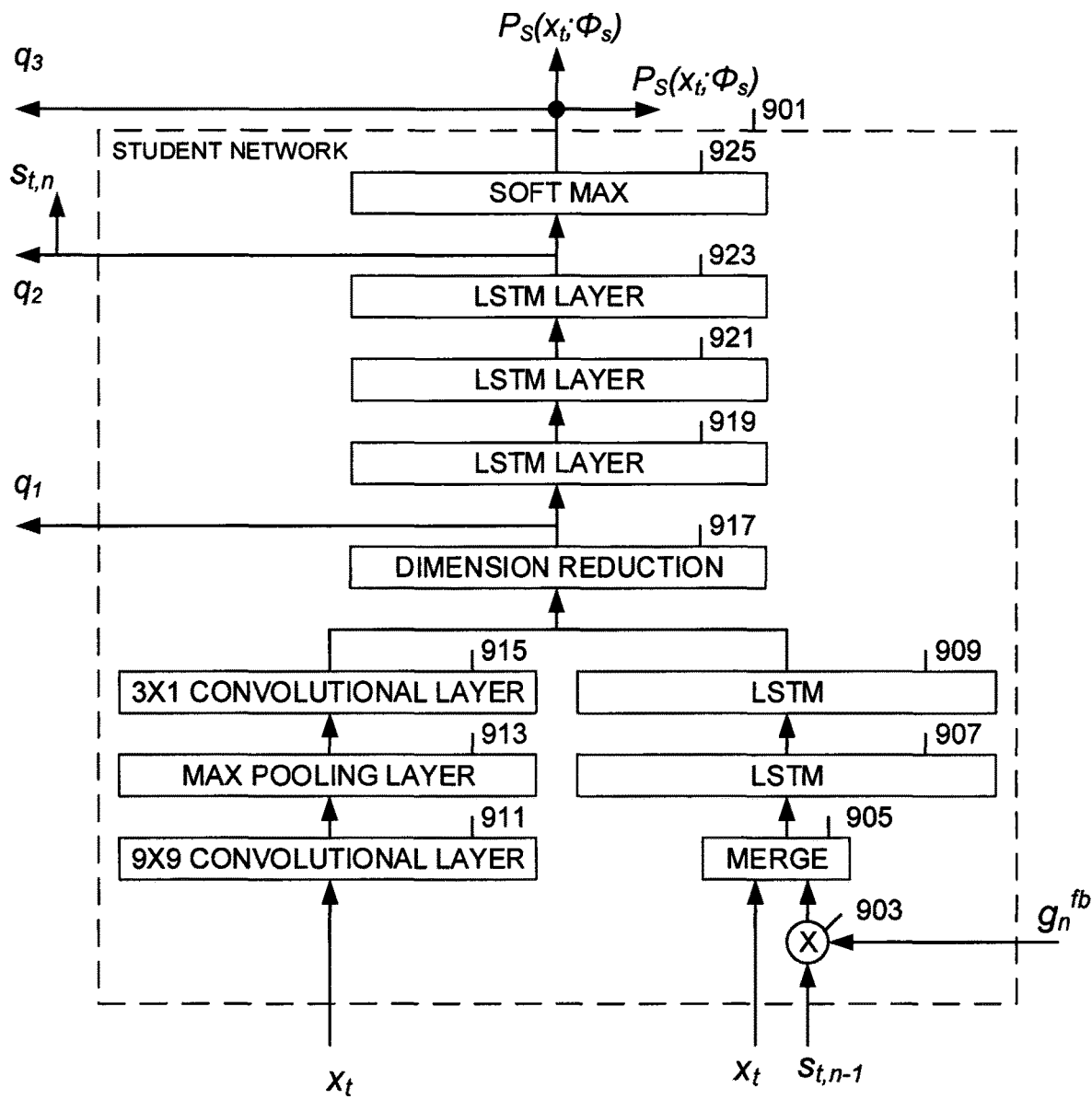
FIG. 9 illustrates an exemplary block diagram of another student network, according to one embodiment.

FIG. 9 illustrates an exemplary implementation diagram of recursive student network, according to one embodiment.

Referring to FIG. 9, a student network 901 includes a multiplier 903, a merge device 905, a first LSTM 907, a second LSTM 909, a 9×9 convolutional layer device 911, a maximum pooling layer device 913, a 3×1 convolutional layer device 915, a dimension reduction layer device 917, a third LSTM layer device 919, a fourth LSTM layer device 921, a fifth LSTM layer device 923, and a soft max device 925.

The student network 901 includes a recursive architecture for distant speech recognition. The dimension reduction layer device 917 includes inputs from a first branch and a second branch. The first branch is a CNN output from the 3×1 convolutional layer device 915 and the second branch is an output of the second LSTM layer device 909. The second branch receives an input $s_{t,n-1}$ from a prior recursion level. The input $s_{t,n-1}$ is merged with a data input $x_t$ and then output to the first LSTM layer device 907. Before merging, the input $s_{t,n-1}$ is multiplied by a feedback gate $g_n^{fb}$. The feedback gate is shown in Equation (13) as follows:

$$g_n^{fb} = \sigma(w_x x_t + w_s s_{t,n-1} + w_h h_{t-1,n}) \quad (13)$$

where, $x_t$ is an input acoustic feature, $s_{t,n-1}$ is the output of the fifth LSTM layer device 923 of the recognition network at an $n-1^{th}$ recursion level and $h_{t-1,n}$ is the output of the second LSTM layer device 909 of the feature network at the $n^{th}$ iteration.

Figure 10:
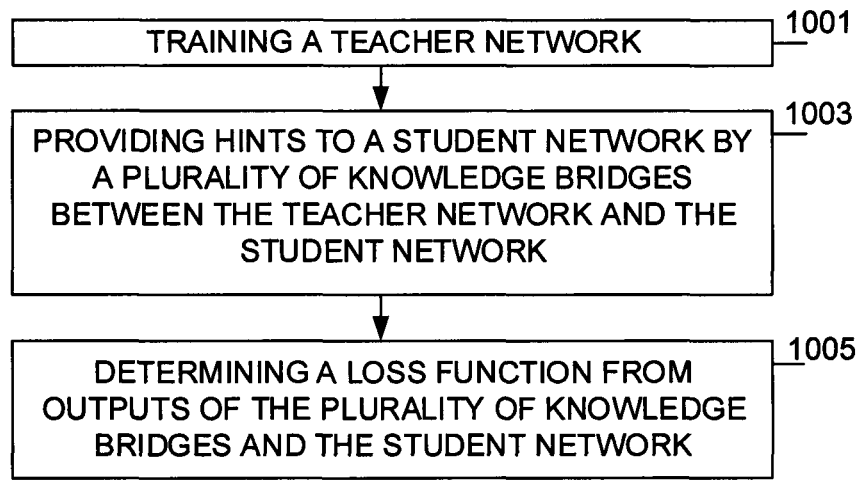
FIG. 10 illustrates an exemplary flowchart of a method of a student-teacher network.

FIG. 10 illustrates an exemplary flowchart of a method of a student-teacher network. At 1001, the present system trains a teacher network. At 1003, the present system provides hints to a student network by a plurality of knowledge bridges between the teacher network and the student network. At 1005, the present system determines a loss function from outputs of the plurality of knowledge bridges and the student network.

Figure 11:
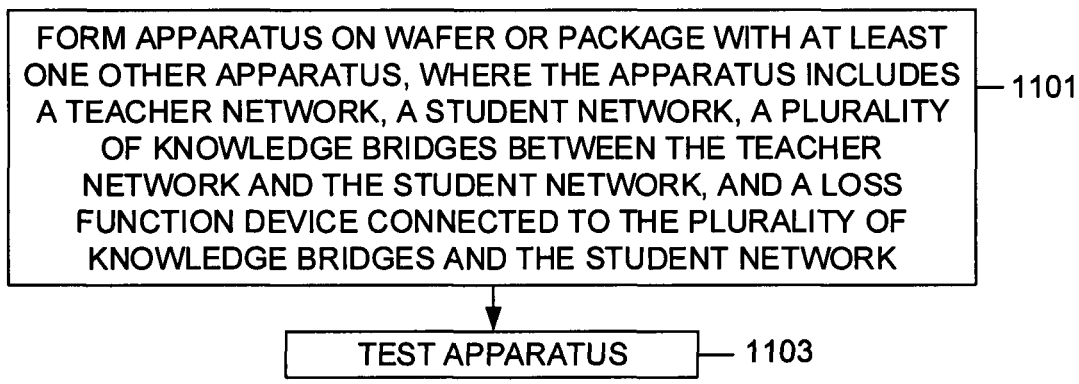
FIG. 11 illustrates an exemplary flowchart of a method of manufacturing a student-teacher network, according to one embodiment.

FIG. 11 illustrates an exemplary flowchart of a method of manufacturing a student-teacher network, according to one embodiment. At 1101, an apparatus is formed on a wafer or a package with at least one other apparatus, where the apparatus includes a teacher network, a student network, a plurality of knowledge bridges between the teacher network and the student network, and a loss function device connected to the plurality of knowledge bridges and the student network.

At 1103, the apparatus is tested. Testing the apparatus may include testing the apparatus using one or more electrical to optical converters, one or more optical splitters that split an optical signal into two or more optical signals, and one or more optical to electrical converters.

Figure 12:
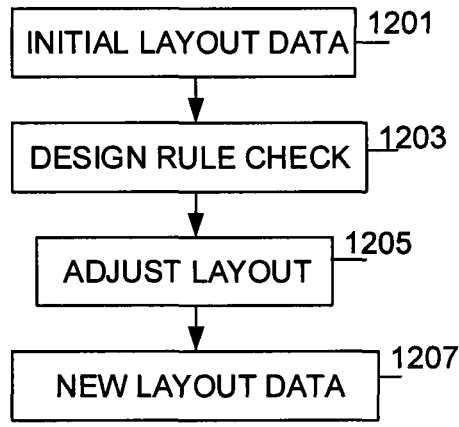
FIG. 12 illustrates an exemplary flowchart of a method of constructing an integrated circuit, according to one embodiment.

FIG. 12 illustrates an exemplary flowchart of a method of constructing an integrated circuit, according to one embodiment. At 1201, initial layout data is constructed. For example, a mask layout is generated for a set of features for a layer of the integrated circuit, wherein the mask layout includes standard cell library macros for one or more circuit features that include an apparatus that includes a teacher network, a student network, a plurality of knowledge bridges between the teacher network and the student network, and a loss function device connected to the plurality of knowledge bridges and the student network.

At 1203, a design rule check is performed. For example, the method may check the relative positions of the macros for compliance with layout design rules after generating the mask layout.

At 1205, the layout is adjusted. For example, the method, upon detection of noncompliance with the layout design rules by any of the macros, may modify the mask layout by modifying each of the noncompliant macros to comply with the layout design rules.

At 1207, new layout data is generated. For example, the method may generate a mask according to the modified mask layout with the set of features for the layer of the integrated circuit. Then, the integrated circuit layer according to the mask may be manufactured.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
   a teacher network;
   a student network;
   a plurality of knowledge bridges between the teacher network and the student network, where each of the plurality of knowledge bridges provides a hint about a function being learned, and where a hint includes a mean square error or a probability; and
   a loss function connected to the plurality of knowledge bridges and the student network,
   wherein each of the teacher network and the student network comprises a first convolutional layer, a second convolutional layer, at least one long short term memory (LSTM) layer, and a soft maximum layer, and
   wherein each of the teacher network and the student network is a recursive teacher network and a recursive student network, respectively.

2. The apparatus of claim 1, wherein the first convolutional layer comprises a 9×9 convolutional layer and the second convolutional layer comprises a 3×1 convolutional layer device.

3. The apparatus of claim 1, wherein each of the recursive teacher network and the recursive student network is:

$$m_t^n = g(W_1 i_t^n(x_t) + W_2 f_t^n(s_t^{n-1}) + b)$$

wherein $m_t^n$ is an output of a sub-block M of the corresponding recursive teacher network or student network at time t in a recursive level n, n is an integer, g is a non-linear function, $W_1$, $W_2$, and b are internal learnable parameters of sub-block M, $i_t^n$ is an output of a sub-block I of the corresponding recursive teacher network or student network at time t in a recursive level n, $x_t$ is an acoustic input at time t, $f_t^n$ is an output of a sub-block F of the corresponding recursive teacher network or student network at time t in a recursive level n, and $s_t^{n-1}$ is an output of a sub-block L of the corresponding recursive teacher network or student network at time t in a recursive level n−1, and
wherein the loss function is:

$$L(\phi_s) = \sum_{i=1}^{N} \alpha_i e_i(\phi_s)$$

wherein $\phi_s$ is a collection of learnable parameters, N is an integer indicating a number of knowledge bridges, $\alpha_t$ is a predetermined weighting factor, and $e_t$ is an error measure.

4. The apparatus of claim 3, wherein the recursive teacher network and the recursive student network is comprised of one of a plurality of teacher networks or one teacher network, respectively.

5. The apparatus of claim 4, wherein the recursive teacher network and the recursive student network have one of a same number of levels of recursion or a different number of levels of recursion.

6. The apparatus of claim 1, wherein a first of the plurality of knowledge bridges is configured to determine $$L_{DR}(\phi_f) = \sum_{t=1}^{T_{mb}} |q_S^f(x_t;\phi_f) - q_T^f(x_t^*)|^2$$

where $\phi_f$ is a collection of parameters in a feature network of the student network, $q_T^f$ is an output of a feature network of the teacher network, $q_S^f$ is an output of the feature network of the student network, $x_t$ is a noisy input, $x_t^*$ is a non-noisy input, and $T_{mb}$ is the number of mini-batch frames.

7. The apparatus of claim 6, wherein a second of the plurality of knowledge bridges is configured to determine $$L_{LSTM3}(\phi_f,\phi_r) = \sum_{t=1}^{T_{mb}} |q_S^r(x_t;\phi_f,\phi_r) - q_T^r(x_t^*)|^2$$

where $\phi_f$ is a collection of parameters in a feature network of the student network, $\phi_r$ is a set of learnable parameters in a recognition network of the student network, $q_S^r$ and $q_T^r$ are outputs of third long short term memory (LSTM) layers in recognition networks of the teacher network and the student network, respectively, $x_t^{noisy}$ is a noisy input, $x_t^{clean}$ is a non-noisy input, and $T_{mb}$ is the number of mini-batch frames.

8. The apparatus of claim 7, wherein a third of the plurality of knowledge bridges is configured to determine $$L_{KD}(\phi_f,\phi_r) = (1-\alpha)\sum_{t=1}^{T_{mb}} CE(P_T(x_t^*),P_S(x_t;\phi_f,\phi_r)) + \alpha\sum_{t=1}^{T_{mb}} CE(y_t^{label},P_S(x_t;\phi_f,\phi_r))$$

where $\phi_f$ is a collection of parameters in a feature network of the student network, $\phi_r$ is a set of learnable parameters in a recognition network of the student network, α is a weighting factor, CE0 is a cross-entropy function, P0 is softmax output of the recognition network of the student network, $y_t^{label}$ is a label at time t, $P_T$ and $P_S$ are softmax output probabilities of the teacher network and the student network, respectively, $x_t$ is a noisy input, $x_t^*$ is a non-noisy input, and $T_{mb}$ is the number of mini-batch frames.

9. The apparatus of claim 1, wherein the loss function device is configured to determine $$L(\phi_f,\phi_r) = L_{KD}(\phi_f,\phi_r) + \beta L_{DR}(\phi_f,\phi_r) + \gamma L_{LSTM3}(\phi_f)$$

where $\phi_f$ is a collection of parameters in a feature network of the student network, $\phi_r$ is a set of learnable parameters in a recognition network of the student network, β and γ are scaling factors for the second and third knowledge bridges, $L_{KD}(\phi_f, \phi_r)$ is an output of a first of the plurality of knowledge bridges, $L_{DR}(\phi_f, \phi_r)$ is an output of a second of the plurality of knowledge bridges, and $L_{LSTM3}(\phi_f)$ is an output of a third of the plurality of knowledge bridges.

10. The apparatus of claim 9, wherein $\phi_f$ is a collection of distant speech received by a microphone in a feature network of the student network, and where the teacher network receives close proximity speech received by the microphone, wherein the close proximity speech is closer to the microphone than the distant speech.

11. A method, comprising:
    training a teacher network;
    providing hints to a student network by a plurality of knowledge bridges between the teacher network and the student network, wherein a hint includes a mean square error or a probability; and
    determining a loss function from outputs of the plurality of knowledge bridges and the student network,
    wherein each of the teacher network and the student network comprises a first convolutional layer, a second convolutional layer, at least one long short term memory (LSTM) layer, and a soft maximum layer, and
    wherein each of the teacher network and the student network is a recursive teacher network and a recursive student network, respectively.

12. The method of claim 11, wherein the first convolutional layer comprises a 9×9 convolutional layer and the second convolutional layer comprises a 3×1 convolutional layer.

13. The method of claim 11, wherein each of the recursive teacher network and the recursive student network is:

$$m_t^n = g(W_1 i_t^n(x_t) + W_2 f_t^n(s_t^{n-1}) + b)$$

wherein $m_t^n$ is an output of a sub-block M of the corresponding recursive teacher network or student network at time t in a recursive level n, n is an integer, g is a non-linear function, $W_1$, $W_2$, and b are internal learnable parameters of sub-block M, $i_t^n$ is an output of a sub-block I of the corresponding recursive teacher network or student network at time t in a recursive level n, $x_t$ is an acoustic input at time t, $f_t^n$ is an output of a sub-block F of the corresponding recursive teacher network or student network at time t in a recursive level n, and $s_t^{n-1}$ is an output of a sub-block L of the corresponding recursive teacher network or student network at time t in a recursive level n−1, and
wherein the loss function is:

$$L(\phi_s) = \sum_{i=1}^{N} \alpha_i e_i(\phi_s)$$

wherein $\phi_s$ is a collection of learnable parameters, N is an integer indicating a number of knowledge bridges, $\alpha_i$ is a predetermined weighting factor, and $e_i$ is an error measure.

14. The method of claim 13, wherein the recursive teacher network and the recursive student network is comprised of one of a plurality of teacher networks or one teacher network, respectively.

15. The method of claim 14, wherein the recursive teacher network and the recursive student network have one of a same number of levels of recursion or a different number of levels of recursion.

16. The method of claim 11, wherein a first of the plurality of knowledge bridges is configured to determine $$L_{DR}(\phi_f) = \sum_{t=1}^{T_{mb}} |q_S^f(x_t; \phi_f) - q_T^f(x_t^*)|^2$$

where $\phi_f$ is a collection of parameters in a feature network of the student network, $q_T^f$ is an output of a feature network of the teacher network, $q_S^f$ is an output of the feature network of the student network, $x_t$ is a noisy input, $x_t^*$ is a non-noisy input, and $T_{mb}$ is the number of mini-batch frames.

17. The method of claim 16, wherein a second of the plurality of knowledge bridges is configured to determine $$L_{LSTM3}(\phi_f,\phi_r) = \sum_{t=1}^{T_{mb}} |q_S^r(x_t;\phi_f,\phi_r) - q_T^r(x_t^*)|^2$$

where $\phi_f$ is a collection of parameters in a feature network of the student network, $\phi_r$ is a set of learnable parameters in a recognition network of the student network, $q_S^r$ and $q_T^r$ are outputs of third long short term memory (LSTM) layers in recognition networks of the teacher network and the student network, respectively, $x_t$ is a noisy input, $x_t^*$ is a non-noisy input, and $T_{mb}$ is the number of mini-batch frames.

18. The method of claim 17, wherein a third of the plurality of knowledge bridges is configured to determine $$L_{KD}(\phi_f,\phi_r) = (1-\alpha)\sum_{t=1}^{T_{mb}} CE(P_T(x_t^*), P_S(x_t;\phi_f,\phi_r)) + \alpha \sum_{t=1}^{T_{mb}} CE(y_t^{label}, P_S(x_t;\phi_f,\phi_r))$$

where $\phi_f$ is a collection of parameters in a feature network of the student network, $\phi_r$ is a set of learnable parameters in a recognition network of the student network, α is a weighting factor, CE0 is a cross-entropy function, P0 is softmax output of the recognition network of the student network, $y_i^{label}$ is a label at time t, $P_T$ and $P_S$ are softmax output probabilities of the teacher network and the student network, respectively, $x_t$ is a noisy input, $x_t^*$ is a non-noisy input, and $T_{mb}$ is the number of mini-batch frames.

19. The method of claim 11, wherein the loss function is configured to determine $$L(\phi_f,\phi_r) = L_{KD}(\phi_f,\phi_r) + \beta L_{DR}(\phi_f,\phi_r) + \gamma L_{LSTM3}(\phi_f)$$

where $\phi_f$ is a collection of parameters in a feature network of the student network, $\phi_r$ is a set of learnable parameters in a recognition network of the student network, β and γ are scaling factors for the second and third knowledge bridges, $L_{KD}(\phi_f, \phi_r)$ is an output of a first of the plurality of knowledge bridges, $L_{DR}(\phi_f, \phi_r)$ is an output of a second of the plurality of knowledge bridges, and $L_{LSTM3}(\phi_f)$ is an output of a third of the plurality of knowledge bridges.

20. The method of claim 19, wherein $\phi_t$ is a collection of distant speech received by a microphone in a feature network of the student network, and where the teacher network receives close proximity speech received by the microphone, wherein the close proximity speech is closer to the microphone than the distant speech.

* * * * *